United States Patent
Gegalski

(10) Patent No.: US 6,722,204 B2
(45) Date of Patent: *Apr. 20, 2004

(54) BALANCED FLUID PRESSURE SENSOR

(75) Inventor: Helmut Gegalski, Mülheim-Kärlich (DE)

(73) Assignee: Lucas Industries plc (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/973,478

(22) Filed: Oct. 9, 2001

(65) Prior Publication Data

US 2002/0046611 A1 Apr. 25, 2002

Related U.S. Application Data

(63) Continuation of application No. PCT/EP00/03028, filed on Apr. 5, 2000.

(30) Foreign Application Priority Data

Apr. 9, 1999 (DE) .......................... 199 16 087

(51) Int. Cl.⁷ ............................................. G01L 13/02
(52) U.S. Cl. ....................................................... 73/716
(58) Field of Search ........................ 73/716, 715, 700, 73/717, 730, 116, 118, 756

(56) References Cited

U.S. PATENT DOCUMENTS

| | | |
|---|---|---|
| 2,935,292 A | 5/1960 | Williamson |
| 3,375,802 A | 4/1968 | Lazarre |
| 5,402,824 A | 4/1995 | Hosoya et al. |
| 6,374,679 B1 * | 4/2002 | Babala et al. .................. 73/715 |

FOREIGN PATENT DOCUMENTS

| | | |
|---|---|---|
| DE | GM 1 879 755 | 8/1960 |
| DE | 40 12 619 A1 | 10/1991 |
| DE | 196 44 856 A1 | 5/1997 |
| EP | 1 016 573 A2 | 7/2000 |
| WO | WO 96/33081 | 10/1996 |
| WO | WO 00/30909 | 6/2000 |

\* cited by examiner

*Primary Examiner*—Edward Lefkowitz
*Assistant Examiner*—Charlene Dickens
(74) *Attorney, Agent, or Firm*—MacMillan, Sobanski & Todd, LLC

(57) ABSTRACT

An arrangement for measuring a fluid pressure, comprising a pressure sensor portion (10), which is devised for accommodation in a recess (12), which is open at least at one end, wherein the pressure sensor portion (10) in relation to the recess (12) is to be dimensioned in such a way that the pressure sensor portion (10) is surrounded by a gap (14) for receiving fluid, wherein first and second surfaces (16*a*, 16*b*, 18*a*, 18*b*), which are situated on the pressure sensor portion (10) and in contact with fluid, are so dimensioned and aligned that forces, which are exerted by the fluid pressure on the first surfaces (16*a*, 16*b*) and push the pressure sensor portion (10) in the direction of the open end of the recess, are equal to or lower than the forces, which are exerted by the fluid pressure on the second surfaces (18*a*, 18*b*) and push the pressure sensor portion (10) away from the open end of the recess (12).

20 Claims, 1 Drawing Sheet

BALANCED FLUID PRESSURE SENSOR

CROSS REFERENCE TO RELATED APPLICATIONS

This application is a continuation of PCT Patent Application Ser. No. PCT/EP00/03028 filed Apr. 5, 2000, which claimed priority from German Patent Application Ser. No. 199 16 087.2 filed on Apr. 9, 1999.

BACKGROUND OF INVENTION

The present invention relates to an arrangement for measuring a fluid pressure. In particular, the invention relates to pressure sensors, which are disposed directly in a hydraulic system and/or a hydraulic control unit of a vehicle brake system.

From working practice it is known to fit pressure sensors into a bore or recess in a hydraulic control unit, which comprises, among other things, valve arrangements, in that the pressure sensors have an external thread, which is screwed into a corresponding internal thread provided in the bore or recess. Such a procedure is costly in terms of manufacture, involves assembly time and moreover does not allow electrical and mechanical connection of the pressure sensor directly to a control circuit on a printed circuit board, which is attached to the hydraulic control unit.

As an alternative to the prior art, it is also known to latch the pressure sensor into the bore or recess in that a spring washer, snap ring or the like is biased in an annular groove disposed at the outer periphery of the pressure sensor and latches into a corresponding annular groove of a diametrically opposed shape in the bore or recess as soon as the pressure sensor is inserted deeply enough into the bore or recess. On the one hand, disassembly for servicing purposes is very difficult because the snap ring has to be dimensioned so as to be capable of withstanding high pressure forces of several tens of bars (60 to 120 bar). On the other hand, a mounting of the pressure sensor in the bore or recess which is free of play in the mounting direction may be realised by means of a snap ring only with difficulty. This would, however, be necessary in order to prevent the transfer of tensile or thrust loads of the pressure sensor to the printed circuit board that carries the control circuit.

Even when the pressure sensor is connected by a plug-in connector or plug-in contact to the printed circuit board, axial displacements of more than 50 μm during operation may lead to the contact resistance increasing to several ohms and hence to a considerable corruption of the measured fluid pressure or even to failure of the plug-in connector and/or pressure sensor.

DE-GM 1 879 755 describes a measuring range transfer apparatus for measuring liquid or gas pressures, in which a cylindrical control slide valve is axially displaceable in a housing. At one axial end of the housing medium is supplied to a pressure chamber and directed towards radial bores in the housing. Control slots are formed in the control slide valve and in a specific position of the control slide valve connect one of the bores to a manometer. Axially opposite surfaces of the control slots are designed to be of equal size. The objective is, as the pressure rises or drops, to disconnect or connect one manometer after the other.

From DE 40 12 619 A1 a mobile device for locating leaks in drains is known, which comprises two double walls for sealing off a pressure chamber. The pressure chamber is filled through an axial supply line with water, the pressure drop of which is measured to determine the leakage point. The device is moved progressively through the drain.

SUMMARY OF INVENTION

Proceeding from the previously described prior art, the object of the invention is to provide an arrangement for measuring a fluid pressure, which allows easy assembly, or disassembly, in a minimal amount of time and which during operation does not cause any tensile or thrust loads upon a plug-in connector or a printed circuit board having a control circuit, to which the arrangement is connected.

As a solution to said problem the invention proposes an arrangement for measuring a fluid pressure according to claim 1.

In the arrangement the finding of the invention is brought to bear, namely that the portion with the pressure sensor is fashioned as a body having, in relation to its longitudinal axis, laterally protruding surfaces, wherein the sum of, relative to the longitudinal axis, orthogonal projections of surfaces, which are oriented substantially in a first direction and during operation are wetted by fluid, the pressure of which is to be measured, is substantially equal to, or less than, the sum of, relative to the longitudinal axis, orthogonal projections of surfaces, which are oriented substantially in a second direction opposite to the first direction and during operation are wetted by fluid, the pressure of which is to be measured.

The effect thereby achieved is that, given identical areas, during operation the portion with the pressure sensor is accommodated practically in a force, or pressure, balanced manner in the recess. In contrast to the apparatus described in previously described DE-GM 1 879 755, as pressure increases, the portion with the pressure sensor is not displaced. Given a slight imbalance in favour of the surfaces facing in the direction of the introduction side or introduction opening of the recess, the effect achieved is that, as pressure increases, the portion is pressed more and more firmly in the direction of the base of the recess. This increases the intrinsic reliability of the arrangement and is moreover an important difference from arrangements from prior art, in which an increasing fluid pressure usually has the tendency to push the pressure sensors as a rule out of their assembly bores.

Furthermore, the pressure sensor portion is easily insertable into the recess, thereby enabling short assembly times. Disassembly is also possible very quickly and easily because there are no snap rings retaining the pressure sensor portion. Rather, the pressure sensor portion is accommodated in the recess so as to slide in the sealing seat and may be removed from the recess or inserted into the recess without difficulty.

In particular, with the refinement according to the invention it is also easily possible, when a plurality of pressure sensors are provided in a hydraulic unit, for all of them to be mounted on the same printed circuit board before being attached simultaneously (as it were, in a stroke) to the hydraulic control unit.

In a preferred embodiment of the invention, first and second surfaces, which are situated on the pressure sensor portion and in contact with fluid, are so dimensioned and aligned that forces, which are exerted by the fluid pressure on the first surfaces and push the pressure sensor portion in the direction of the open end of the recess, are equal to the forces, which are exerted by the fluid pressure on the second surfaces and push the pressure sensor portion away from the open end of the recess. Thus, during operation of the pressure sensor the pressure sensor portion does not execute any movements in an axial direction. The pressure sensor portion may therefore be electrically and mechanically connected without difficulty to a printed circuit board for attachment to the hydraulic control unit, either by being directly soldered or welded thereon or contacted via a plug-in connection.

During operation no mechanical (tensile or thrust) loads are exerted by the pressure sensor portion on the electrical connection and/or the printed circuit board.

In a preferred manner the first surfaces and the second surfaces are, in relation to a centre plane, symmetrical to one another. This applies particularly when the pressure sensor portion comprises a circular cylindrical basic body, from which said first surfaces and second surfaces protrude radially or at a diametrically opposed angle (in relation to a plane at right angles to the central longitudinal axis).

In a currently preferred embodiment, the pressure sensor portion in a middle region has a first collar with a substantially closed lateral surface and a first end surface and a second end surface, and wherein the first end surface and the second end surface have substantially identical areas. Disposed at axial distances from the first and the second end surface of the first collar are a second and a third collar, the external dimensions of which are such that the second and the third collar help to guide the pressure sensor portion in the recess and have end surfaces, which each face the first collar and have substantially identical areas.

Disposed between the first collar and the second collar and/or between the first collar and the third collar there is in each case a seal.

The pressure sensor portion may additionally be secured in the recess by a retaining means, preferably a snap ring.

In a preferred manner the pressure sensor portion is so dimensioned and disposed in the recess that the first collar faces a fluid inlet disposed in the wall of the recess. In this case, it is not absolutely necessary for the pressure sensor portion in its mounted state to be situated "at the same height" as the fluid inlet disposed in the wall of the recess. Rather, it should merely be ensured that, when fluid flows into the recess, the fluid does not first encounter one of the first or second surfaces. Thus, the fluid should reach the surfaces practically simultaneously so that the pressure sensor portion does not move in axial direction when the fluid flows in.

In an embodiment of the invention which is particularly easy to manufacture, the pressure sensor portion has a shape which is rotationally symmetrical relative to its central longitudinal axis.

The pressure sensor portion preferably has in the region of the first collar a pressure sensor. The pressure sensor may be a semiconductor pressure sensor.

With the invention it is also possible for ambient atmospheric pressure to prevail outside of the second and/or third collar. In other words, it is only between the second and the third collar that the pressure sensor portion is surrounded by pressurized fluid (the pressure of which is to be measured).

Regions of the pressure sensor portion lying axially further out, delimited by the second and/or third collar and/or the appropriate seals, may be situated in an unpressurized ambient atmosphere.

In a preferred embodiment, the pressure sensor portion and/or at least individual portions of the first, second or third collars have a cylindrical or conical, preferably circular cylindrical or circular conical shape.

The seals, which are disposed between the first collar and the second collar or between the first collar and the third collar, are preferably such that during operation they behave like an incompressible fluid when they are applied against the appropriate surfaces of the pressure sensor portion. It is thereby ensured that no corruption of the measurement occurs as a result of compliant seals. A further property of the seals should be that the regions of the seals, which are covered or wetted by the fluid during operation, are substantially diametrically opposed. Here, the same grounds and dimensioning rules apply as for the first and second surfaces of the pressure sensor portion.

The pressure sensor is therefore formed by a pressure sensor portion, which is surrounded in a fluid-tight manner by the wall of the recess, wherein the pressure sensor portion has two sealing elements (the second and third collars or appropriate seals), which have diametrically opposed sealing surfaces. The fluid, the pressure of which is to be measured, is introduced laterally into an inlet in the wall of the recess between the second and third collars or the appropriate seals.

Further properties, advantages, features and possible variants of the invention will become apparent to those skilled in the art from the following detailed description of a currently preferred embodiment of the invention, when read in light of the accompanying drawing.

BRIEF DESCRIPTION OF DRAWINGS

The sole FIGURE is a diagrammatic sectional view of the arrangement according to the invention for measuring a fluid pressure.

DETAILED DESCRIPTION

Figure 1:
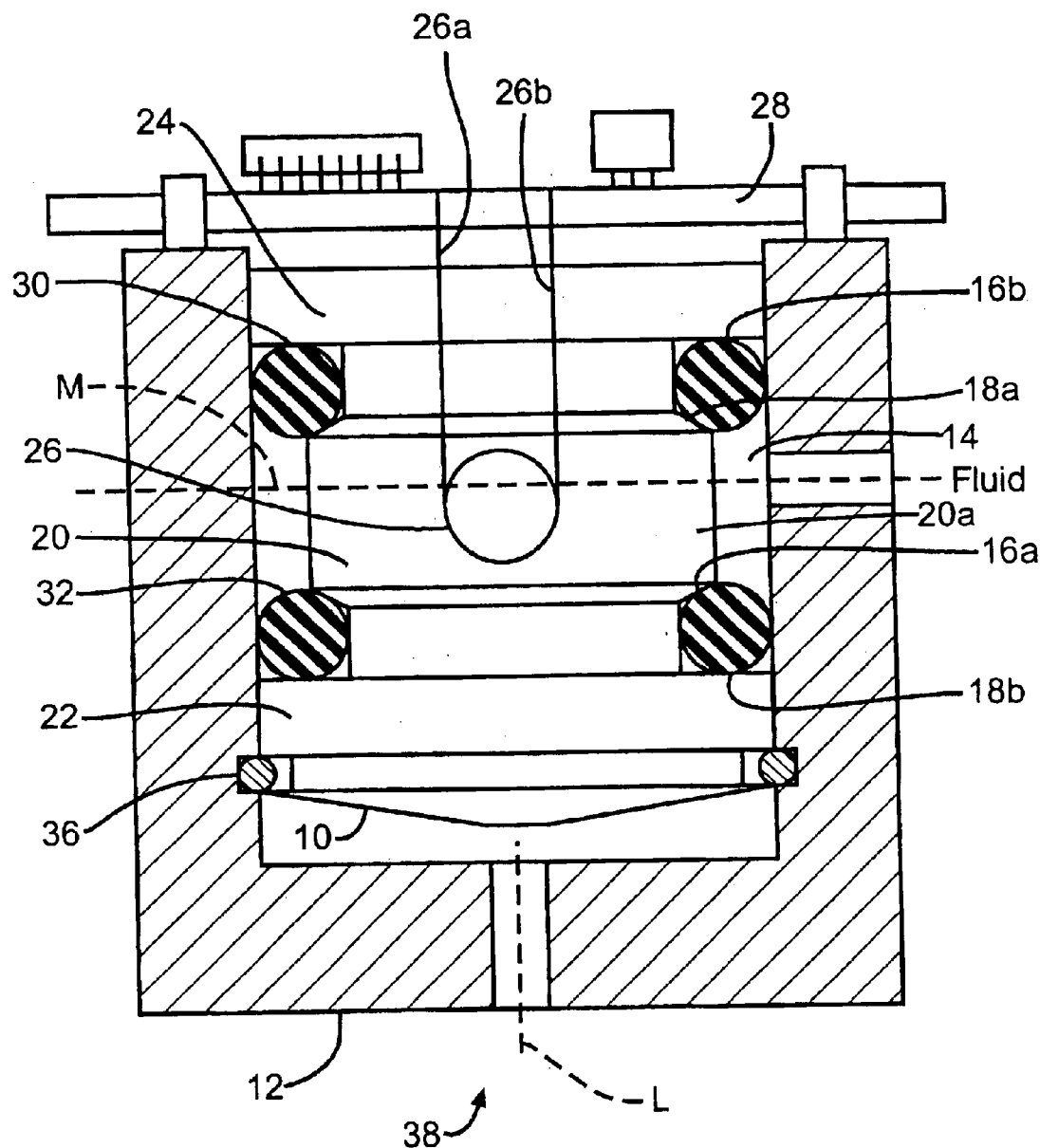

The arrangement for measuring a fluid pressure shown in FIG. 1 is part of an otherwise not further illustrated hydraulic control unit of a vehicle brake system. A substantially cylindrical pressure sensor portion 10 is accommodated in a recess 12.

In relation to the recess 12 said pressure sensor portion 10 is dimensioned and formed in such a way that the pressure sensor portion 10 is surrounded by a gap 14 for receiving fluid. How this is specifically realized is described below.

The substantially cylindrical pressure sensor portion 10 has an elongate body with, in relation to its central longitudinal axis L, laterally protruding surfaces 16a, 16b, 18a, 18b. The laterally protruding surfaces 16a, 16b, 18a, 18b are parts of a first, a second and a third annular collar that are labelled 20, 22, 24, respectively. The first annular collar 20 is formed in an approximately middle region in relation to the overall length of the cylindrical pressure sensor portion 10 integrally on the latter and comprises a substantially closed lateral surface 20a, a first end surface 16a and a second end surface 18a, wherein the first end surface 16a and the second end surface 18a have substantially identical areas and, in relation to the centre plane M, identical projected areas.

The pressure sensor portion 10 is disposed in the recess 12 in such a way that the first collar 20 faces a fluid inlet, which is disposed in the wall of the recess 12, for the fluid, the pressure of which is to be measured. The pressure sensor portion 10 has a pressure sensor 26 in the region of the first collar 20. Said pressure sensor is connected by two wires 26a, 26b to an electronic circuit, which is situated on a printed circuit board 28 above the pressure sensor portion 10. The wires 26a, 26b, when appropriately dimensioned, may also be used to hold the pressure sensor portion 10 as a whole mechanically on the printed circuit board 28. Assembly in particular is facilitated thereby.

The second collar 22 and the third collar 24 are disposed at axial distances from the first and the second end surface 16a, 18a respectively of the first collar 20. Their outside diameters are so dimensioned that the second and the third collar 22, 24 help to guide the pressure sensor portion 10 in the recess 12 in the sealing seat. The second and the third collar 22, 24 have end surfaces 18b, 16b, which each face the first collar 20 and/or the first collar's end surfaces 16a, 18a and which likewise have substantially identical areas.

The sum of, relative to the longitudinal axis L, orthogonal projections of the end surfaces 16a, 16b, which are oriented substantially in a first direction, namely, in a upward direction in FIG. 1, and during operation are wetted by fluid, the pressure of which is to be measured, is substantially equal to the sum of the, relative to the longitudinal axis, orthogonal projections of the end surfaces 18a, 18b, which are oriented substantially in a second direction opposite to the first direction, namely, in an downward direction in FIG. 1, and during operation are wetted by fluid.

Thus, the forces, which are exerted by the fluid pressure on the first surfaces 16a, 16b and push the pressure sensor portion 12 upward in FIG. 1 in the direction of the open end of the recess 12, are equal to the forces, which are exerted by the fluid pressure on the second surfaces 18a, 18b and push the pressure sensor portion 12 downward in FIG. 1 away from the open end of the recess 12.

Disposed between the first collar 20 and the second collar 22 as well as between the first collar 20 and the third collar 24 are seals 32 and 30, respectively. The seals are such that during operation they behave like a fluid when they are applied against the appropriate surfaces of the pressure sensor portion 10. The pressure sensor portion 10 is moreover secured in the recess 12 by a snap ring 36 to prevent it from falling out of the recess 12. Outside of the second and third collar 22, 24 ambient atmospheric pressure may prevail. This is achieved also by providing in the base of the recess 12 an opening 38, which connects the recess 12 to the environment.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An arrangement for measuring a fluid pressure, comprising
    a portion (10) devised for accommodation in a recess (12), which is open at least at one end, wherein the portion (10) being so dimensioned in relation to the recess (12) that the portion (10) is surrounded by an annular recess (14) formed in a surface thereof for receiving fluid, with a fluid inlet disposed in a wall of the recess (12) that is associated with said annular recess (12), the portion (10) including first surfaces (16a, 16b) and second surfaces (18a, 18b), which are situated on the portion (10) and in contact with fluid and are so dimensioned and aligned that forces, which are exerted by the fluid pressure on the first surfaces (16a, 16b) and push the portion (10) in the direction of the open end of the recess (12), are equal to or lower than forces, which are exerted by the fluid pressure on the second surfaces (18a, 18b) and push the portion (10) away from the open end of the recess (12); and
    a pressure sensor (26) carried in the region of said annular recess (14) formed in said portion (10).

2. The arrangement for measuring a fluid pressure according to claim 1, wherein said first and second surfaces (16a, 16b, 18a, 18b), which are situated on said pressure sensor portion (10) and in contact with fluid, are so dimensioned and aligned that said forces, which are exerted by said fluid pressure on said first surfaces (16a, 16b) and push said pressure sensor portion (10) in the direction of the open end of the recess (12), are equal to said forces, which are exerted by said fluid pressure on said second surfaces (18a, 18b) and push said pressure sensor portion (10) away from the open end of the recess (12).

3. The arrangement for measuring a fluid pressure according to claim 2, wherein a first pair (16a and 18a) of said first and second surfaces and a second pair (16b, 18b) of said first and second surfaces are, in relation to a center plane (M), symmetrical to one another.

4. The arrangement for measuring a fluid pressure according to claim 3 wherein said pressure sensor portion (10) is secured in said recess (12) by a retaining means.

5. The arrangement for measuring a fluid pressure according to claim 3 wherein said pressure sensor portion (10) has a shape, which in relation to a center line (L) is rotationally symmetrical.

6. The arrangement for measuring a fluid pressure according to claim 1, wherein the pressure sensor portion (10) in a middle region includes a first collar (20) with a substantially closed lateral surface 20a located between one of said first surfaces (16a) and one of said second surfaces (18a), and wherein said first surface (16a) and said second surface (18a) of said first collar (20) and in relation to a center plane (M) have substantially identical projected areas.

7. The arrangement for measuring a fluid pressure according to claim 6 wherein disposed at axial distances from said first and said second surfaces (16a, 18a) of said first collar (20) are a second and a third collar (22, 24), the external dimensions of which are such that said second and third collars help guide the pressure sensor portion (10) in the recess (12) and include the other of said first and second surfaces (16b, 18b), which face said first collar (20), and in relation to said center plane (M) have substantially identical projected areas.

8. The arrangement for measuring a fluid pressure according to claim 7 wherein said pressure sensor portion and at least portions of said first, second and third collars (20, 22, 24) have a cylindrical shape.

9. The arrangement for measuring a fluid pressure according to claim 7 wherein a seal is disposed between one of said first collar (20) and said second collar (22) and said first collar (20) and said third collar (24).

10. the arrangement for measuring a fluid pressure according to claim 9 wherein ambient atmospheric pressure prevails outside of at least one of said second and third collars (22, 24).

11. The arrangement for measuring a fluid pressure according to claim 9 wherein said seals (30, 32), which are disposed between the first collar (20) and the second collar (22) or between the first collar (20) and the third collar (24), are such that during operation said seals behave like a fluid when they are applied against one of said first surfaces (16b) and one of said second surfaces (18b) of said pressure sensor portion (10).

12. The arrangement for measuring a fluid pressure according to claim 9 wherein said pressure sensor portion (10) is secured in the recess (12) by a retaining means.

13. The arrangement for measuring a fluid pressure according to claim 6 wherein the pressure sensor portion (10) is disposed in said recess (12) in such a way that said first collar (20) faces said fluid inlet disposed in said wall of said recess (12).

14. The arrangement for measuring a fluid pressure according to claim 6 wherein said pressure sensor portion

(10) has a shape, which in relation to a center line (L) is rotationally symmetrical.

15. The arrangement for measuring a fluid pressure according to claim 6 wherein said pressure sensor portion (10) includes a pressure sensor (26) in the region of said first collar (20).

16. The arrangement for measuring a fluid pressure according to claim 1 wherein said pressure sensor portion (10) is an elongate body that includes said first and second surfaces (16a, 16b, 18a, 18b) and a longitudinal axis (L) and further wherein the sum of, relative to said longitudinal axis (L), orthogonal projections of said first surfaces (16a, 16b), which are oriented substantially in a first direction and during operation are wetted by a fluid, the pressure of which is to be measured, is substantially equal to or less than the sum of, relative to the longitudinal axis, orthogonal projections of said second surfaces (18a, 18b), which are oriented substantially in a second direction opposed to said first direction and during operation are wetted by said fluid, the pressure of which is to be measured.

17. The arrangement for measuring a fluid pressure according to claim 4 wherein said retaining means is a snap ring (36).

18. The arrangement for measuring a fluid pressure according to claim 12 wherein said retaining means is a snap ring (36).

19. The arrangement for measuring a fluid pressure according to claim 7 wherein a first seal (32) is disposed between said first collar (20) and said second collar (22) and a second seal (30) is disposed between said first collar (20) and said third collar (24).

20. The arrangement for measuring a fluid pressure according to claim 7 wherein said pressure sensor portion and at least portions of said first, second and third collars (20, 22, 24) have a conical shape.

\* \* \* \* \*